United States Patent [19]

Wulf et al.

[11] 4,097,752

[45] Jun. 27, 1978

[54] POWER SUPPLY OF INSTALLATIONS DRIVEN BY INTERNAL COMBUSTION ENGINES, ESPECIALLY OF MOTOR VEHICLES

[75] Inventors: Helmut Wulf, Ostfildern; Wolfgang Weidemann, Fellbach, both of Germany

[73] Assignee: Daimler-Benz Aktiengesellschaft, Germany

[21] Appl. No.: 703,603

[22] Filed: Jul. 8, 1976

[30] Foreign Application Priority Data

Jul. 12, 1975 Germany ............................. 2531244

[51] Int. Cl.² .................... B60K 25/00; F02G 5/02
[52] U.S. Cl. ........................ 290/20; 290/1 R; 180/65 A; 60/597
[58] Field of Search ............... 290/1 R, 4 D, 18, 19, 290/20; 60/320, 597, 624, 712, 721, 698; 180/65 R, 65 A, 65 D; 310/DIG. 5, 74, 261

[56] References Cited

U.S. PATENT DOCUMENTS

| | | | |
|---|---|---|---|
| 1,118,269 | 11/1914 | Creveling | 60/320 |
| 1,181,988 | 5/1916 | Breitung | 290/38 R |
| 1,339,177 | 5/1920 | Dyer | 60/618 |
| 3,217,696 | 11/1965 | Kiekhaefer | 60/320 |
| 3,541,783 | 11/1970 | Schmuck | 60/618 |
| 3,992,885 | 11/1976 | Forster | 60/698 |

*Primary Examiner*—Gene Z. Rubinson
*Assistant Examiner*—William L. Feeney
*Attorney, Agent, or Firm*—Craig & Antonelli

[57] ABSTRACT

A power supply of installations, especially of motor vehicles, driven by internal combustion engines which consists of a generator, a storage battery and loads as well as corresponding switching means; at least one thermionic converter acted upon by the hot exhaust gases serves as generator while at least one electric motor feeding mechanically into the drive connection of the installation is provided as load; the thermionic converter or converters as well as preferably also the storage capacity of the battery are designed as regards their power output for approximately the utilizable thermal energy of the exhaust gases of the internal combustion engine.

13 Claims, 1 Drawing Figure

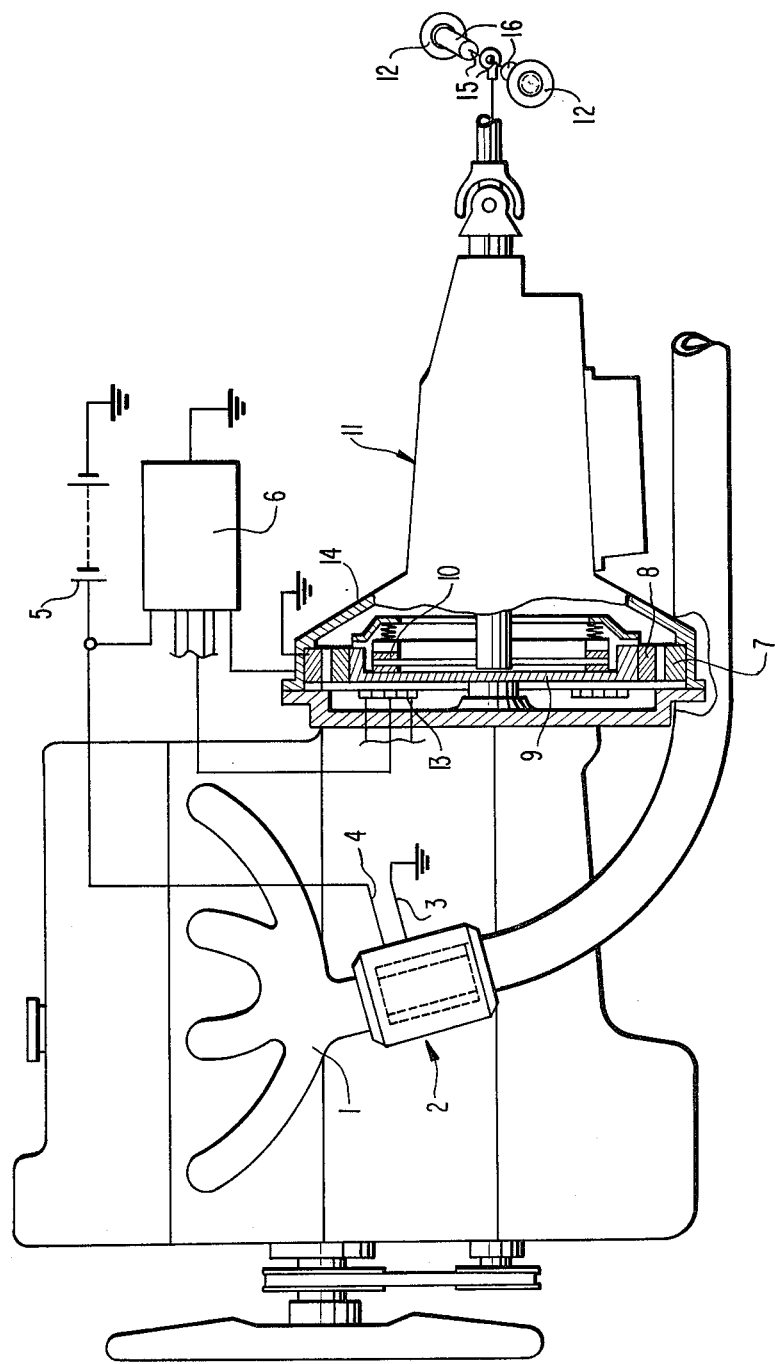

POWER SUPPLY OF INSTALLATIONS DRIVEN BY INTERNAL COMBUSTION ENGINES, ESPECIALLY OF MOTOR VEHICLES

The present invention relates to an electrical power supply of installations driven by internal combustion engines, especially of motor vehicles, consisting of a generator, of a storage battery and of electrical loads as well as the corresponding switching means, whereby at least one thermionic converter acted upon by the hot exhaust gases of the internal combustion engine serves as generator, as described in German Application P 24 270 74.4.

Different loads such as lights, starter, ventilation, ignition, injection installation and under certain circumstances also auxiliary apparatus, such as, for example, radio are customarily connected with the power supply of the aforementioned vehicles. The power supply is normally fed in such vehicles by the internal combustion engine with the aid of a generator, i.e., the alternator, whereby a battery is interconnected as storage device. These prior art systems represent, as such, a technical detour and therefore have a number of disadvantages. In the first instance, the wear and the noises of the mechanical drive of the alternator as well as the space requirement for such a drive should be mentioned in connection therewith.

The present invention is therefore concerned with the task to avoid these disadvantages. This means an installation is to be proposed by means of which a direct high-efficiency feed of the electrical power supply network without the technical detour by way of the mechanical work is possible.

As is also known in internal combustion engines, approximately one-third of the energy originally present in the consumed fuel is discharged non-used with the hot exhaust gases. The aforementioned prior German application proposes to gain back at least a part of this thermal energy contained in the exhaust gases by thermionic converters and to feed such recaptured energy into the electric power supply of the installation or of the vehicle. However, the energy requirement of the electric power supply is relatively small so that only slight energy quantities can be gained back.

The present invention is therefore concerned with the task to gain back in a useful and profitable manner a still larger proportion of the exhaust gas heat. This is achieved according to the present invention in that also at least one electric motor mechanically feeding into the drive power flow of the installation or of the motor vehicle is provided as electric load and in that the thermionic converter or converters as well as preferably also the storage capacity of the battery are designed as regards power approximately to the utilizable thermal energy content of the exhaust gases of the internal combustion engine.

As a result of the conversion of larger exhaust heat quantities into electrical energy and as a result of the conversion thereof by means of an electric motor into mechanical drive-energy, the internal combustion engine can be relieved and fuel can be economized.

Appropriately, the rotor of the electric motor is securely connected with a rotating part in the power flow connection for the mechanical drive of the installation or of the motor vehicle and the stator of the electric motor is arranged about the rotor fixed against rotation and is immovably supported radially with respect to the rotor.

A particularly favorable arrangement for the electric motor is the area of the flywheel of the internal combustion engine, whereby the rotor of the electric motor may serve as flywheel mass. The motor can then be constructed as disk-rotor motor.

In order also to be able to adapt the electric motor to the different drive and load conditions, it is appropriately constructed as controllable motor.

In order to be able to partly gain back also the braking energy in a profitable, useful manner, provision may be made that the electric motor is also adapted to be connected as generator, preferably feeding electric power into the power supply.

In order to be able to use the motor also as starter for the internal combustion engine, it is appropriate if the electric motor is constructed as conventional motor with commutable poles, i.e., as pole-changeable motor.

Accordingly, it is an object of the present invention to provide an installation for feeding the electric power supply of motor vehicles which avoids by simple means the aforementioned shortcomings and drawbacks encountered in the prior art.

Another object of the present invention resides in a system for feeding the electric power supply of motor vehicles which not only improves the efficiency of the motor vehicle but also reduces wear and noise normally encountered with the drive of the alternator.

A further object of the present invention resides in an installation for feeding the electric power supply of motor vehicles which permits to maximize the amount of energy gained back from the exhaust gases.

A still further object of the present invention resides in a power supply of installations driven by internal combustion engines, especially of motor vehicles, in which a large part of the energy present in the exhaust gases is gained back as useful energy.

Still a further object of the present invention resides in a system of the type described above in which the internal combustion engine can be effectively relieved and fuel can be economized by the use of the energy in the exhaust gases for purposes of driving the vehicle.

Still another object of the present invention resides in a system of the type described above which minimizes the number of parts necessary for carrying out the various functions of the vehicle.

These and other objects, features and advantages of the present invention will become more apparent from the following description when taken in connection with he accompanying drawing which shows, for purposes of illustration only, one embodiment in accordance with the present invention, and wherein:

The single FIGURE is a side elevational view of an internal combustion engine for motor vehicles with a thermionic converter and including an electric traction auxiliary motor within the area of the flywheel of the internal combustion engine in accordance with the present invention.

Referring now to the single FIGURE of the drawing, in the internal combustion engine illustrated therein, a thermionic converter generally designated by reference numeral 2 is arranged in the exhaust gas line 1 at a place near the engine where the exhaust gases are still very hot, whereby the hot exhaust gases flow through the thermionic converter 2. The thermionic converter 2—for purposes of maintaining a predetermined temperature gradient—is constructed double-walled on the outside thereof and is connected with the cooling water circulatory system of the engine. The thermionic converter 2 is so designed and constructed as regards its power output that it is able to convert up to acceptable limits the entire heat energy of the exhaust gas at full load of the internal combustion engine into electrical energy. The thermionic converter 2 is connected by means of the current-carrying electrical connections thereof 3 and 4 to the ground and to the positive terminal of a storage battery 5. An electric motor 7/8 with a stator 7 and a rotor 8 is fed from this battery 5 by way of a control unit 6 of conventional construction. The motor 7/8 is arranged within the area of the flywheel 9 or of the main clutch 10 of the internal combustion engine in the power-flow connection ahead of the change-speed transmission 11. The stator 7 is non-rotatably held in the clutch housing bell 14 of the transmission 11 about the flywheel disk 9. The rotor 8 is arranged on the flywheel disk 9 concentrically in the stator 7 and may serve simultaneously as flywheel mass for the internal combustion engine. This arrangement of the motor 7/8 within the power-flow connection, in addition to saving a separate feed-in gear, offers the advantage that the transmission ratio of the change-speed gear 11 can also be utilized and the motor 7/8 can operate with relatively high rotational speeds and with small torques. By reason of the arrangement in the power-flow connection ahead of the clutch 10, the flow of power from the motor 7/8 to the driven wheels 12 can be separated and the motor 7/8 can be utilized as starter for the internal combustion engine. For this reason, the electric motor 7/8 is equipped with an increased number of collectors 13 in order that it is pole-changeable and is adapted to be switched to the low rotational speed necessary for the starting of the internal combustion engine but to a high torque.

Owing to a corresponding construction of the control apparatus 6 by conventional means and of the electric motor 7/8, the latter is also adapted to be switched over to operate as generator which can then be utilized as brake-generator in the pushing operation of the vehicle. The load of the generator can be realized by means of resistances and/or by the electric feeding of the power supply, i.e., of the battery 5. The electric motor 7/8 is controllable in its rotational speed by reason of a corresponding construction, and the control apparatus includes for that purpose the necessary switching means known as such in the prior art and therefore not described in detail herein. Also, as illustrated, the driving wheels 12 are driven via axles 15 and an electric motor 16, provided for each driven wheel 12, is arranged in the region of the axle 15 of the associated driving wheel.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A power supply arrangement for installations driven by internal combustion engines, which comprises a generator means, a storage battery means and load means as well as switching means and means for operatively connecting the generator means, storage battery means, load means and switching means, at least one thermionic converter means acted upon by the hot exhaust gases of the internal combustion engine serving as generator means, characterized in that also at least one electric motor means is provided as load means which mechanically feeds into the power flow of the drive connection of the installation, the thermionic converter means being constructed and rated for power output in accordance with the utilizable thermal energy content of the exhaust gases of the internal combustion engine, the electric motor means including a rotor and a stator, the rotor being operatively connected with a rotating part in the power flow connection for the mechanical drive of the installation, and the stator being arranged non-rotatably about the rotor and being radially immovably supported with respect to the rotor, and the electric motor means being arranged within the area of a flywheel of the internal combustion engine the rotor serving at least as a part of the flywheel mass.

2. An arrangement according to claim 1, characterized in that in addition to the thermionic converter means, also the storage capacity of the battery means is constructed and rated for power output in accordance with the utilizable thermal energy content of the exhaust gases.

3. An arrangement according to claim 2, characterized in that the installation is a motor vehicle.

4. An arrangement according to claim 1, characterized in that the rotor is securely connected with said rotating part.

5. An arrangement according to claim 4, characterized in that the electric motor means is regulatable by control means.

6. An arrangement according to claim 5, characterized in that the electric motor means is operable to be switched by said control means to operate as generator means feeding the power supply.

7. An arrangement according to claim 6, characterized in that the electric motor means is operable as pole-changeable electric motor.

8. An arrangement according to claim 7, characterized in that one electric motor means each is provided per driving wheel of the vehicle, which is arranged in the region of the axle of the associated driving wheel.

9. An arrangement according to claim 8, characterized in that the thermionic converter means is arranged in the exhaust system of the internal combustion engine near the internal combustion engine.

10. An arrangement according to claim 8, characterized in that in addition to the thermionic converter means, also the storage capacity of the battery means is constructed and rated for power output in accordance with the utilizable thermal energy content of the exhaust gases.

11. A power supply arrangement for installations driven by internal combustion engines, which comprises a generator means, a storage battery means and load means as well as switching means and means for operatively connecting the generator means, storage battery means, load means and switching means, at least one thermionic converter means acted upon by the hot exhaust gases of the internal combustion engine serving as generator means, characterized in that also at least one electric motor means is provided as load means which mechanically feeds into the power flow of the drive connection of the installation, the thermionic converter means being constructed and rated for power output in accordance with the utilizable thermal energy content of the exhaust gases of the internal combustion engine, the electric motor means being regulatable by control means, and the electric motor means being operable as pole-changeable electric motor.

12. An arrangement according to claim 11, characterized in that the electric motor means is operable to be switched by said control means to operate as generator means feeding the power supply.

13. A power supply arrangement for installations driven by internal combustion engines, which comprises a generator means, a storage battery means and load means as well as switching means and means for operatively connecting the generator means, storage battery means, load means and switching means, at least one thermionic converter means acted upon by the hot exhaust gases of the internal combustion engine serving as generator means, characterized in that also at least one electric motor means is provided as load means which mechanically feeds into the power flow of the drive connection of the installation, the thermionic converter means being constructed and rated for power output in accordance with the utilizable thermal energy content of the exhaust gases of the internal combustion engine, the at least one electric motor means including one electric motor means each provided per driving wheel of the vehicle and arranged in the region of the axle of the associated driving wheel.

* * * * *